Sept. 18, 1945.                J. D. LYALL                2,385,092
                    MEASURING AND DISCHARGING DEVICE
                Filed April 10, 1943           2 Sheets-Sheet 1
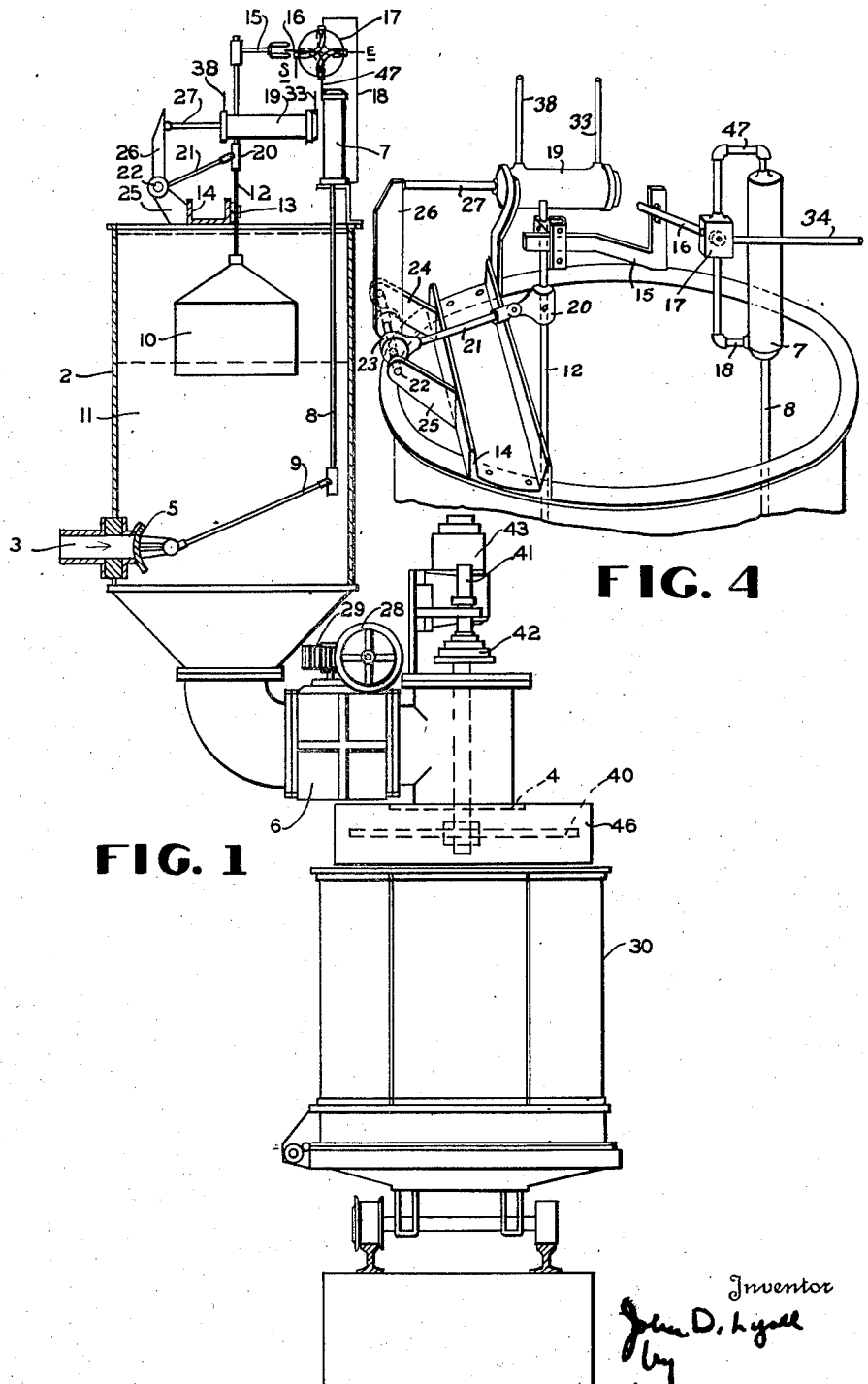

Sept. 18, 1945.    J. D. LYALL    2,385,092
MEASURING AND DISCHARGING DEVICE
Filed April 10, 1943    2 Sheets-Sheet 2

Patented Sept. 18, 1945

2,385,092

UNITED STATES PATENT OFFICE 2,385,092

MEASURING AND DISCHARGING DEVICE

John D. Lyall, Lancaster Township, Lancaster County, Pa., assignor to Armstrong Cork Company, Lancaster, Pa., a corporation of Pennsylvania Application April 10, 1943, Serial No. 482,642

8 Claims. (Cl. 222—65)

This invention relates to a device for measuring and discharging liquids and is particularly adapted for accurately measuring relatively large quantities of material to within narrow limits. The invention is useful in measuring charges of a liquid slurry received from a source of supply and discharging the same into molds such as those used in forming mineral wool insulating blocks.

An object of the invention is to provide a filling and discharging device so arranged that precisely measured quantities may be received from a source of supply and discharged into a receptacle uniformly on each operation of the device. Another object of the invention is to provide a so-called "snap action" for controlling the inlet and discharge valves to obviate inaccuracies in the amount filled or discharged. A further object is to provide an arrangement effective for closing the inlet upon the charging of a desired amount and for holding the inlet closed until complete discharge has been effected.

The invention will be described in connection with the attached drawings, using a device for measuring a dilute fibrous slurry, such as that employed in the manufacture of mineral wool insulation blocks, as a typical embodiment.

Figure 1 is a side elevation of the device partially broken away with the pilot valve mechanism and piping illustrated diagrammatically;

Figure 4 is a perspective view of the control mechanism for the inlet valve.

Figure 2:
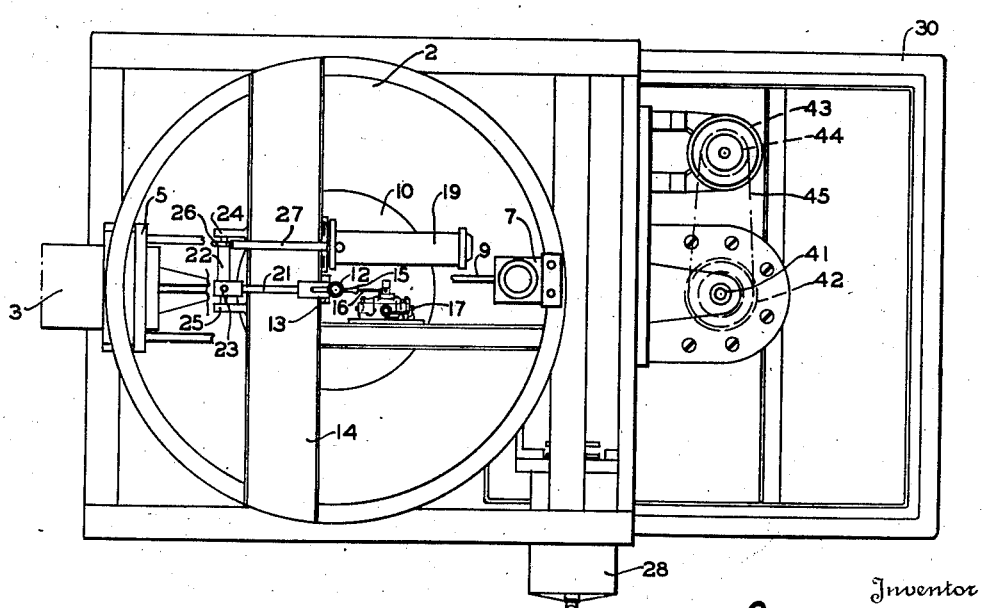
Figure 2 is a top plan view of the device shown in Figure 1.

Referring to Figures 1 and 2, the measuring and discharging device consists of tank 2 having an inlet opening 3 in communication with a suitable source of bulk supply, for example, a mixing tank, and a discharge opening 4 communicating with a receptacle into which a measured quantity of slurry is to be delivered. A valve 5 controls the inlet opening 3 and an air controlled valve 6 is provided in the discharge line leading to the opening 4. The inlet and discharge conduits may of course be separate from the tank 2 but in the arrangement shown the inlet and outlet are both attached to the lower portion of the tank.

The valve 5 is actuated by an air cylinder 7 through a linkage arrangement 8—9. The supply of air for the cylinder 7 is controlled through a float 10 positioned within the tank 2 and elevated in response to the rise of the level of the slurry in the tank. The mechanism is shown in Figure 1 in the position assumed when the tank is filled to the desired level and is ready for discharge.

The float 10 carries a control rod 12 which passes through a bearing 13 attached to a channel support 14 which extends transversely of the tank. The control rod 12 has affixed to it near its upper end a bifurcated control arm 15 which is effective for imparting a movement of rotation to a control handle 16 of a pilot control valve 17 diagrammatically shown in Figure 1. The pilot control valve 17 is connected to the air cylinder 7 which controls the operation of the inlet valve 5. When the control rod 12 is elevated as shown in Figure 1, the bifurcated control arm 15 rotates the operating handle 16 of the pilot control valve 17 to a position where air from a source of supply S passes through the valve into line 18 which connects to the lower end of the air cylinder 7. When air is so applied, the piston of air cylinder 7 is elevated and the valve 5 is moved to the closed position shown, through the linkage 8—9. In operation, as liquid flows into the tank 2 through the inlet opening 3, the float 10 and control rod 12 are elevated, bringing the bifurcated control arm 15 to a position where the pilot control valve 17 is rotated to the position indicated by solid lines in Figure 1 and air is supplied to the cylinder 7 to close the valve 5. The parts at that moment assume the positions shown in Figure 1.

An air cylinder 19 is provided to hold the float 10 in elevated position and prevent the opening of the valve 5 when the tank 2 is being emptied and until the contents of the tank 2 have been completely discharged. This limiting action is effected through control rod 12 as shown in Figures 1 and 2. A collar 20 is attached to the rod 12 and to this collar 20 is pivoted a link 21, the opposite end of which is fixed to a shaft 22 by set screw 23. The shaft 22 is journalled in bearings 24 and 25 and is free for limited rotation controlled by lever 26 which is also keyed to the shaft 22. This control lever 26 is held in upright or limiting position, as shown in Figure 1, by a push rod 27 which is actuated by the piston of the air cylinder 19. If for any reason the float has not elevated the control rod 12 to a position where pilot control valve 17 has been rotated, push rod 27 will nevertheless move the control lever 26 to the limiting position and insure closing and locking of valve 5. When in such position, downward movement of the control rod 12 is arrested for the control lever 26 and the link 21 are each keyed to the common shaft 22, and arrest of movement of the lever 26 by the push rod 27 prevents movement of the link 21. As a result, when control lever 26 is held in upright position, downward movement of control rod 12 which carries float 10 is prevented. The air cylinder 19 is interconnected with the air control for the discharge valve 6 so that push rod 27 is retracted only after complete discharge of the container contents, as will be later described in greater detail.

Discharge valve 6 is provided with an air cylinder 28 which in the embodiment shown in Figure 1 is effective for rotating the valve through a wheel 29. A valve with air remote control unit may be used for this purpose. The arrangement of this valve is such that when air is applied to one end of the cylinder the wheel 29 is rotated to close the valve and, when air is supplied to the opposite end of the cylinder, rotation in an opposite direction is effected and the valve is opened. When the air controlled discharge valve 6 is opened, the contents of the tank 2 are free to flow through the discharge opening 4 into any desired receptacle. In the embodiment shown the discharge opening 4 is disposed above a mold arrangement 30 such as disclosed in the copending application of Boyd R. Abbott, Serial No. 482,645, filed April 10, 1943, and entitled "Forming machine."

Figure 3:
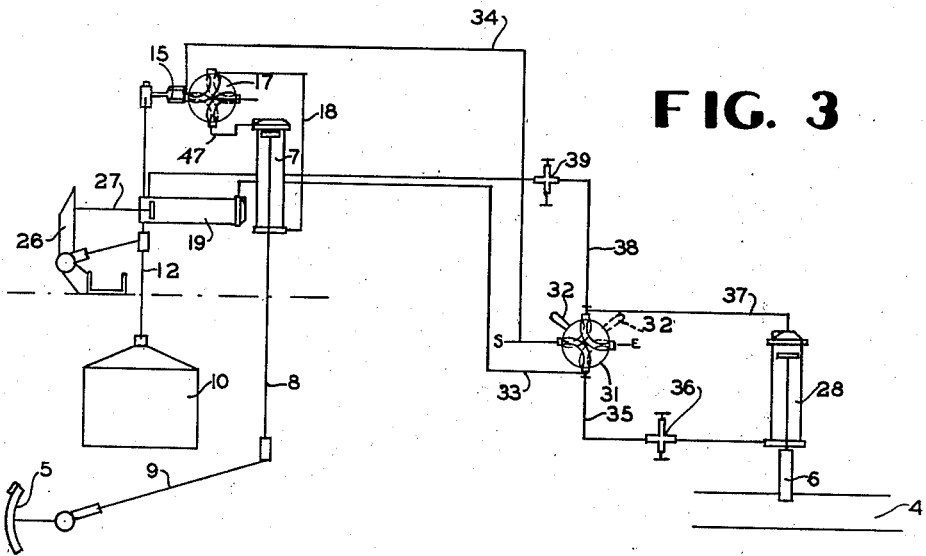
Figure 3 is a schematic diagram showing the control arrangement.

Referring now to Figure 3 which schematically shows the piping arrangement for the air or other fluid for controlling the various fluid operated cylinders, there is shown a master control valve 31 which is effective for controlling the supply of air from source S to the air cylinders 19 and 28. In this view the parts are shown schematically in the position they would assume when the tank 2 is filled to the desired level and the contents of the tank are about to be discharged through the discharge opening 4. With the operating handle 32 of the valve 31 in the position shown in solid line in Figure 3, air will flow from the source S through the valve 31, as shown by the solid lines, into a line 33 connected directly with the upper end of air cylinder 19 to move push rod 27 into position to hold control lever 26 in upright or limiting position, preventing control rod 12 and float 10 from falling. This insures that valve 5 will remain closed until push rod 27 is retracted to permit the float to fall. (Air is constantly supplied from the source of supply S through line 34 to pilot control valve 17.) At the same time air passes from the source S through the valve 31 and into a line 35 which controls the operation of air cylinder 28 which operates discharge valve 6. A two-direction speed control valve 36 is provided in the line 35 to retard the flow of air from the source S toward the cylinder 28 but to permit rapid exhausting of the cylinder 28 when its direction of operation is reversed. A two-direction Hanna speed control valve may be used for this purpose. Air flowing from source S through the line 35 and the speed control valve 36 elevates the piston for air cylinder 28 opening the discharge valve 6 and the contents of the tank 2 are then free for discharge through the opening 4. So long as the operating handle 32 is in the position shown in solid lines in Figure 3, the valve 5 will be closed, the valve 6 will be opened, and the contents of the tank 2 discharged. The float 10 will be held in elevated position by the control lever 26 which is fixed against movement by push rod 27 of air cylinder 19.

When the entire contents of the tank 2 have been discharged, the operating handle 32 for the master control valve 31 is rotated to the position shown in dotted lines in Figure 3 and air then flows from the source S directly into the top of cylinder 28 through line 37 immediately closing valve 6 and exhausting air from the cylinder 28 through the two-way speed control valve 36 and line 35 into the exhaust line E. As previously mentioned, the speed control valve 36 permits rapid exhaustion of air so that valve 6 is closed rapidly. Air also flows from the source S through the valve 31 into line 38 through a two-way speed control valve 39 similar to the valve 36 and from there into the lower end of air cylinder 19 to retract the piston and push rod 27. The speed control valve 39 is effective for limiting the flow of air into the air cylinder 19 to retard the retraction of the push rod 27 until after the valve 6 has been closed. As the push rod 27 is retracted, the control lever 26 is free to rotate and float 10 falls. When float 10 falls, control arm 15 engages the operating handle 16 which rotates the pilot control valve 17 to the position shown in dotted lines. Air then passes from the source S through line 34, valve 17, and a line 47 to the upper end of air cylinder 7, causing the piston in the cylinder to move downwardly opening valve 5, whereupon fluid flows through the inlet opening 3 filling the tank to the desired level, elevating the float 10, which rotates operating handle 16 of pilot control valve 17 and valve 5 is closed.

The speed control valve 39 in the line to the cylinder 19 is effective to permit rapid exhaust of the air in cylinder 19 when the master valve 32 is in the position shown in solid lines in Figure 3 so that air fed from the source S through the line 33 will instantly lock the lever 26 in vertical position and hold the float 10 in its upper position with the valve 5 closed so that upon opening of the discharge valve 6 which is delayed through speed control valve 36 there will be no movement of the float 10 which might result in opening of the inlet valve 5 prior to the complete discharge of the contents of tank 2. The speed control valves are desirable but not essential to the operation of the device but when employed insure proper timing of the closing and opening of the inlet and outlet valves.

As shown in Figure 1, a perforated plate 40 is positioned below the discharge opening 4. This plate is fixed to a shaft 41 carrying a pulley 42 and is rotated by a motor 43 through a pulley 44 and belt 45. A spray shield 46 is provided to prevent the contents from being whipped outwardly by the rotating plate 40.

The plate 40 serves to uniformly deposit the slurry 11 into the mold 30 and is desirable where the slurry includes solids such as mineral wool fibers which must be deposited in the mold in a uniform manner in order to obtain a final product having a substantially constant density throughout. With certain types of slurry the plate may be dispensed with, for example, where a liquid only is being discharged. Here, obviously, the plate may be eliminated.

With the device shown, it is possible to accurately measure batches of relatively large volume. For example, in the manufacture of mineral wool blocks, the charged slurry may weigh in the neighborhood of 1,500 pounds.

From the foregoing it will be clear that the operation of inlet valve 5 is controlled by the pilot valve 17 which is in turn actuated by float 10. The master control valve 32 operates the discharge valve 6 and the air cylinder 19 which holds the float and control rod in elevated position but permits their downward movement after complete discharge of the contents of the tank and closing of the discharge valve 6. The retraction of the push rod 27 is substantially instantaneous and the dropping of the float 10 actuates the pilot valve 17 to open inlet valve 5 with what may be termed a "snap action" as compared with an arrangement whereby the float directly controls the opening of the valve as the liquid level in the tank recedes. The discharge valve 6 cannot be opened until the inlet valve 5 has been closed and locked in closed position by air cylinder 19, thus insuring that the total quantity discharged will not be changed by any liquid which might flow into the tank if the inlet valve were not locked in closed position. With the valving arrangement, it is possible to obtain a "snap action" of the inlet valve, its operation being controlled by the pilot valve 17 and this in turn is actuated by the float 10 through the air cylinder 19 and its associated mechanism which holds the float 10 in elevated position until the discharge valve has closed and thereupon drops the float 10 and instantly the valve 5 is opened.

While I have illustrated and described a preferred embodiment of my invention, it will be understood that the same may be otherwise embodied and practiced within the scope of the following claims.

I claim:

1. A liquid measuring and discharging device comprising a vessel having inlet and discharge conduits to supply liquid to and discharge the same from said vessel, a valve controlling the inlet conduit, a valve controlling the discharge conduit, a fluid actuated device for opening and closing said inlet valve, a float in said vessel responsive to the level of liquid therein, a control valve for said fluid actuated device, means controlled by said float for operating said control valve to close said inlet valve when said vessel is filled to a desired level and to open said inlet valve when the float drops, a second fluid actuated device for holding said float controlled means in locked position when said inlet valve is closed, a third fluid actuated device for opening and closing said discharge valve, and means connecting said second and third fluid actuated devices to automatically unlock said float controlled means and close said discharge valve.

2. A liquid measuring and discharging device comprising a vessel having inlet and discharge conduits to supply liquid to and discharge the same from said vessel, an air cylinder for actuating said inlet valve, an air cylinder for locking said inlet valve in closed position, an air cylinder for actuating said discharge valve, means responsive to the level of liquid in said vessel for controlling the supply of air to said air cylinder controlling the inlet valve, and means for simultaneously supplying air to the cylinder controlling the locking of said inlet valve to unlock the same and to the cylinder controlling the discharge valve to close the same.

3. A liquid measuring and discharging device comprising a vessel having inlet and discharge conduits to supply liquid and discharge the same from said vessel, an air cylinder for actuating said inlet valve, an air cylinder for locking said inlet valve in closed position, an air cylinder for actuating said discharge valve, means responsive to the level of liquid in said vessel for controlling the supply of air to said air cylinder controlling the inlet valve, means for simultaneously supplying air to the cylinder controlling the locking of said inlet valve to unlock the same and to the cylinder controlling the discharge valve to close the same, two-way speed control valves in the lines for the supply of air to said two last named cylinders, a valve connecting said lines in parallel, the speed control valve in the line to the air cylinder for controlling the locking means retarding the flow of air to the cylinder to unlock said locking means, and the speed control valve in the line to the cylinder controlling operation of the discharge valve retarding the flow of air to the cylinder to open said discharge valve.

4. In a liquid measuring device, the combination with a receptacle having inlet and outlet valves controlled by separate fluid actuated pistons, and a locking device for said inlet valve controlled by a fluid actuated piston, of a circuit for the supply of fluid to said pistons comprising a conduit for the supply of fluid to a pilot valve responsive to the level of liquid in said receptacle for controlling the supply of fluid to the fluid actuated piston for said inlet valve, a separate conduit for the supply of fluid to a master control valve effective in one position to simultaneously communicate fluid to said fluid actuated piston for said discharge valve to open the same and to said fluid actuated piston for said locking device to hold the same in locked position and effective in a second position to simultaneously communicate fluid to said fluid actuated piston for said discharge valve to close the same and to said fluid actuated piston for said locking device to unlock the same.

5. In a liquid measuring and discharging device, the combination of a vessel having inlet and discharge conduits to supply liquid to and discharge the same from said vessel, a valve in the inlet conduit, means for opening and closing said inlet valve, means responsive to the level of liquid in the vessel for controlling the opening and closing of said inlet valve, a fluid actuated device for holding said liquid level responsive means in locked position with said inlet valve closed, a second fluid actuated device for opening and closing said discharge valve, means connecting said fluid actuated devices to automatically unlock said liquid level responsive means and close said discharge valve, and a speed control valve associated with said fluid actuated locking device to retard the release of said locking device.

6. In a liquid measuring and discharging device, the combination of a vessel having inlet and discharge conduits to supply liquid to and discharge the same from said vessel, an air cylinder for actuating said inlet valve, an air cylinder for locking said inlet valve in closed position, an air cylinder for actuating said discharge valve, means responsive to the level of liquid in the vessel for controlling the supply of air to said air cylinder controlling the inlet valve, and means for simultaneously supplying air to the cylinder controlling the locking of said inlet valve to unlock the same and to the cylinder controlling the discharge valve to close the same, and a speed control valve associated with the means for supplying air to the cylinder controlling the locking means to retard the release of the locking device until after the opening of the discharge valve.

7. In a liquid measuring and discharging device, the combination with a receptacle having inlet and discharge conduits to supply liquid to and discharge the same from said receptacle, of a valve for the inlet conduit, an air cylinder for controlling the operation of said inlet valve, a float responsive to the level of liquid in said receptacle, an air control valve for said air cylinder, means carried by said float for operating said air control valve to supply air to said cylinder to close said inlet valve upon predetermined rise of said float and to supply air to said cylinder to open said valve upon fall of said float, locking means operative upon actuation into one position for holding said float and the air control valve operating means carried by said float against fall and permitting fall upon actuation into a second position, a valve for the discharge conduit, and interlocking means for simultaneously opening said discharge valve and actuating said locking means into valve holding position.

8. A liquid measuring and discharging device, the combination of a vessel having inlet and discharge conduits to supply liquid to and discharge the same from said vessel, a valve in the inlet conduit, a valve in the discharge conduit, fluid actuating means for opening and closing said inlet valve, fluid actuating means for opening and closing said discharge valve, means for simultaneously supplying fluid to both of said fluid actuating means to close said inlet valve and open said discharge valve, and a speed control valve in the fluid supply to said discharge valve actuating means to delay the opening thereof.

JOHN D. LYALL.